Patented Aug. 13, 1935

2,010,921

UNITED STATES PATENT OFFICE 2,010,921

ACID DYE

Werner Lange, Dessau-Ziebigk in Anhalt, Germany, assignor to General Aniline Works, Inc., New York, N. Y., a corporation of Delaware No Drawing. Application April 25, 1933, Serial No. 667,939. In Germany June 24, 1932

14 Claims. (Cl. 260—97)

The present invention relates to the manufacture of valuable dyes having the characteristics of acid dyes by treating in alkaline solution with an oxidizing agent, particularly a cupric oxide compound, an azo dye which is obtainable by alkaline coupling of 3-amino-1-hydroxybenzene which may be monosubstituted in the amino group and has a free 4-position relative to the hydroxyl group, with a diazo compound containing at least one sulfonic acid or carboxylic acid group lending solubility, said dyes containing no group capable of forming a metal complex. In this manner the azo dye is changed in respect of its tint and the fastness of the dyeings which it yields is improved.

According to the views hitherto held it must be supposed that these azo dyes, in so far as they contain no further chromophoric groups, can be transposed into the colorless triazoles (pseudo-azimides); thus, for instance, the dye sulfanilic acid-azo-3-amino-1-hydroxybenzene would be transposed in the following manner:—

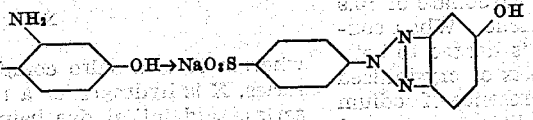

However, there is actually obtained a strong reddish yellow dye of unknown constitution.

The new dyes differ from the parent dyes by an essentially improved fastness to light and are especially useful for dyeing leather, on which they produce yellow to brown tints.

If, contrary to this invention, a 4-substitution product of 3-amino-1-hydroxybenzene in which the substituent is in the free 4-position to the hydroxyl, such as 1-methyl-2-amino-4-hydroxybenzene, is used instead of the 3-amino-1-hydroxybenzene having no substituent in 4-position to the hydroxyl, there are obtained in the coupling ortho-hydroxy-azo dyes which on treatment with compounds containing copper yield sparingly soluble reddish-copper compounds of no technical value instead of the products obtainable by this invention.

The following examples illustrate the invention, the parts being by weight:—

*Example 1.*—17.3 parts of 1-aminobenzene-4-sulfonic acid are diazotized and coupled with a solution alkaline with sodium carbonate of 10.9 parts of 3-amino-1-hydroxybenzene. When coupling is complete there are added about 25 parts of calcined sodium carbonate. The whole is brought to boiling and an aqueous solution of 50 parts of crystallized copper sulfate is run in. After boiling for a short time the mass is filtered while hot and the dye is salted out from the filtrate.

Whereas the solution of the parent dye alkaline with sodium carbonate has an orange-brown tint, that of the conversion product is a dull green-yellow. The dye dyes chrome leather yellow-brown tints; the dyeing is essentially faster to light than that of the parent dye.

If instead of 1-aminobenzene-4-sulfonic acid there are used 21.8 parts of 4-nitro-1-aminobenzene-2-sulfonic acid, there is obtained a dye which dyes chrome leather golden-yellow.

Instead of 50 parts of crystallized copper sulfate there may be used, for example, 12 parts of hydrogen peroxide of 30 per cent strength in the presence of some cupric oxide as a catalyst. Instead of copper sulfate and sodium carbonate there may be used the equivalent quantity of an ammoniacal solution of cupric oxide.

*Example 2.*—The diazo compound obtained from 17.3 parts of 1-aminobenzene-4-sulfonic acid is allowed to flow, together with a solution of 7 parts of sodium hydroxide, into a solution of 18.5 parts of 3-hydroxydiphenylamine in 750 parts of water and 5 parts of sodium hydroxide at about 20° C. When coupling is complete, 25 parts of sodium carbonate are added, the whole is heated to boiling and there is then added a solution of 50 parts of crystallized copper sulfate. After boiling for about ½ hour the solution is filtered and the dye salted out from the filtrate, after this has been neutralized with hydrochloric acid. The dye dyes chrome leather yellow-brown tints, which are essentially faster to light than the dyeing obtained with the parent dye.

*Example 3.*—35.7 parts of 4-aminoazobenzene-3.4'-disulfonic acid are diazotized in known manner and coupled with a solution, alkaline with sodium carbonate, of 10.9 parts of 3-amino-1-hydroxybenzene. When coupling is complete, there are added 25 parts of sodium carbonate and 50 parts of crystalized copper sulfate and the whole is boiled for a short time. After filtration, the dye is separated from the filtrate by addition of hydrochloric acid and common salt. It dyes chrome leather copper-red tints.

*Example 4.*—30.9 parts of 4-nitro-4'-aminodiphenylamine-2-sulfonic acid are diazotized and coupled in a solution alkaline with sodium carbonate with 10.9 parts of 3-amino-1-hydroxybenzene. When coupling is complete, 25 parts of sodium carbonate and a solution of 50 parts of cystallized copper sulfate are added and the mixture is boiled for about 1 hour in a reflux apparatus. After filtration the dye is salted out from the filtrate. It dyes chrome leather and also vegetable tanned leather Havana brown.

If, instead of 3-amino-1-hydroxybenzene there are used 12.3 parts of 1-methyl-4-amino-2-hydroxybenzene there is obtained a dye which dyes leather somewhat redder tints.

*Example 5.*—21.8 parts of 4-nitro-1-aminobenzene-2-sulfonic acid are diazotized in known manner and coupled with a solution alkaline with sodium carbonate of 10.9 parts of 1-hydroxy-3-aminobenzene. When coupling is complete, the mixture is heated to 80° C. and the nitro group is reduced by stirring the mixture for about an hour with 16 parts of sodium sulfide, whereby the reddish yellow color changes to orange red. The reduced dye is separated by adding common salt and hydrochloric acid. After filter-pressing the dye is dissolved in 1000 parts of water with the addition of 20 parts of sodium carbonate, whereupon, after heating to boiling, a solution of 40 parts of crystallized copper sulfate is run in. After stirring for a short time the conversion of the dye is complete, the tint having passed from orange to yellow brown. The dye is separated by filtering the precipitated oxide of copper and salting out in the usual manner. It dyes chrome leather and vegetable tanned leather reddish brown.

The same final product is obtained if a solution of cupric oxide in ammonia is used instead of the copper sulfate.

*Example 6.*—32.5 parts of the acid sodium salt of 2-aminonaphthalene-4.8-disulfonic acid are diazotized in the usual manner and coupled with a solution alkaline with sodium carbonate of 10.9 parts of 1-hydroxy-3-aminobenzene. When coupling is complete, the mixture is heated to boiling and a solution of 50–55 parts of crystallized copper sulfate is run in in the presence of sodium carbonate in excess. After boiling for about 1 hour, the conversion of the dye is complete, the tint having passed from reddish yellow to orange brown. After filtering the solution and partially neutralizing the sodium carbonate in excess by addition of hydrochloric acid, the dye is separated in the usual manner. It dyes chrome leather and vegetable tanned leather clear yellowish brown tints.

When carrying out the oxidation with cupritetrammonium sulfate, likewise, a brown dye is obtained showing, however, a somewhat violet brown tint.

*Example 7.*—23.9 parts of 2-amino-8-hydroxynaphthalene-6-sulfonic acid are diazotized in the known manner. The diazo compound is allowed to run into a solution of 10.9 parts of 1-hydroxy-3-aminobenzene and 10 parts of anhydrous sodium carbonate. When coupling is complete, the mixture is heated to boiling and a solution of 55 parts of crystallized copper sulfate is run in. After boiling for some hours, the mixture is filtered and the dye is separated from the filtrate by addition of common salt. The tint of the dye, likewise, has become essentially browner by the treatment with copper oxide. It dyes chrome leather and vegetable tanned leather clear reddish brown.

Summarizing, the new dyes are obtainable by oxidizing as set forth in the foregoing examples an azo dye of the general formula

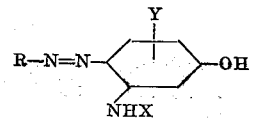

wherein R is the radicle of a diazo compound containing at least one sulfonic acid or carboxylic acid radicle, X means hydrogen, alkyl, aryl or aralkyl and Y means hydrogen, alkyl, halogen, alkoxy. These dyes shall not contain groups capable of forming a metal complex compound, namely —OH, —COOH, —O—alkyl, in ortho-position to the azo group. All these possibilities of substitution are considered to be within the spirit of the invention and the scope of the following claims.

What I claim is:—

1. The process which comprises heating an azo dye of the general formula

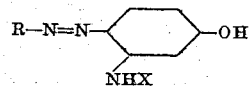

wherein R is a sulfo compound of the benzene or naphthalene series, X is hydrogen or a radicle of the benzene series, said initial dye being in the ortho-position to the azo group free from groups capable of forming a metal complex, in an alkaline medium with a cupric oxide compound.

2. The process which comprises heating an azo dye of the general formula

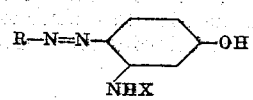

wherein R is a sulfo compound of the benzene series, X is hydrogen or a radicle of the benzene series, said initial dye being in the ortho position to the azo group free from groups capable of forming a metal complex, in an alkaline medium with hydrogen peroxide in the presence of a copper compound.

3. The process which comprises heating an azo dye of the general formula

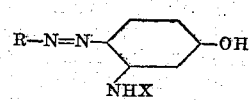

wherein R is a sulfo compound of the benzene series, X is hydrogen or a radicle of the benzene series, in an alkaline medium with a cupric oxide compound.

4. The process which comprises heating an azo dye of the general formula

wherein R is a sulfo compound of the benzene series, X is hydrogen or a radicle of the benzene series, in an alkaline medium with hydrogen peroxide in the presence of a copper compound.

5. The process which comprises heating an azo dye of the general formula

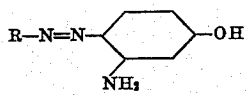

wherein R is a sulfo compound of the benzene series, in an alkaline medium with a cupric oxide compound.

6. The process which comprises heating the dye corresponding to the formula

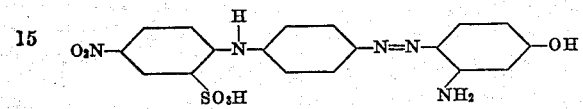

in an alkaline medium with a cupric oxide compound.

7. The process which comprises heating the dye corresponding to the formula

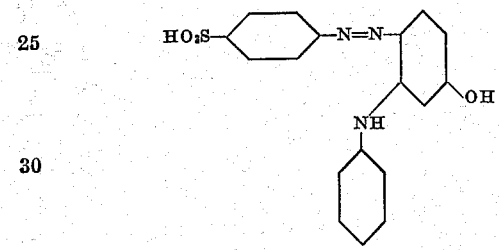

in an alkaline medium with a cupric oxide compound.

8. The process which comprises heating the dye corresponding to the formula in an alkaline medium with a cupric oxide compound.

9. The dyes dyeing leather from an acid bath yellow to brown tints of good fastness and being obtainable by the process set forth in claim 1.

10. The dyes dyeing leather from an acid bath yellow to brown tints of good fastness and being obtainable by the process set forth in claim 3.

11. The dyes dyeing leather from an acid bath yellow to brown tints of good fastness and being obtainable by the process set forth in claim 5.

12. The dye dyeing leather from an acid bath brown tints of good fastness and being obtainable by the process set forth in claim 6.

13. The dye dyeing leather from an acid bath copper red tints of good fastness and being obtainable by the process set forth in claim 7.

14. The dye dyeing leather from an acid bath yellowish brown tints of good fastness and being obainable by the process set forth in claim 8.

WERNER LANGE.